United States Patent [19]
Owen

[11] Patent Number: 5,079,499
[45] Date of Patent: Jan. 7, 1992

[54] TRANSFORMER PROVIDING TWO MULTIPLE PHASE OUTPUTS OUT OF PHASE WITH EACH OTHER, AND PUMPING SYSTEM USING THE SAME

[75] Inventor: Donald W. Owen, Yukon, Okla.

[73] Assignee: Southwest Electric Company, Oklahoma City, Okla.

[21] Appl. No.: 545,374

[22] Filed: Jun. 28, 1990

[51] Int. Cl.$^5$ .................... H02M 7/04; H01F 33/00
[52] U.S. Cl. ........................ 323/361; 363/5; 363/64; 336/5
[58] Field of Search ............ 363/3, 5, 64, 84, 35, 363/37, 125, 126; 323/361; 336/5

[56] References Cited

U.S. PATENT DOCUMENTS

| | | | |
|---|---|---|---|
| 3,036,258 | 5/1962 | Friedrich | 363/5 |
| 4,106,089 | 8/1978 | Fettinger | 363/153 |
| 4,255,784 | 3/1981 | Rosa | 363/5 |
| 4,713,554 | 12/1987 | Henderson | 307/64 |
| 4,761,726 | 8/1988 | Brown | 363/51 |

FOREIGN PATENT DOCUMENTS 1070670  1/1984  U.S.S.R. .................... 363/5

Primary Examiner—Peter S. Wong
Attorney, Agent, or Firm—Laney, Dougherty, Hessin & Beavers

[57] ABSTRACT

A three-phase transformer includes six windings, disposed in three pairs, all of which six windings are serially interconnected. A desired turns ratio between the two windings of each pair establishes a desired phase shift between one three-phase output of the connected windings and a second three-phase output of the windings. These two windings can be used in combination to drive a load, such as an induction motor, such as through a twelve pulse rectifier requiring two three-phase outputs out of phase by 30°. Alternately, one of the three-phase outputs can be used to supply the full load of the motor directly. This is particularly useful in a electric submersible pumping system having a three-phase induction motor which is normally operated by a maintenance intensive twelve-pulse rectifier, which motor needs to be directly driven through a by-pass motor controller when the rectifier is in maintenance.

16 Claims, 4 Drawing Sheets

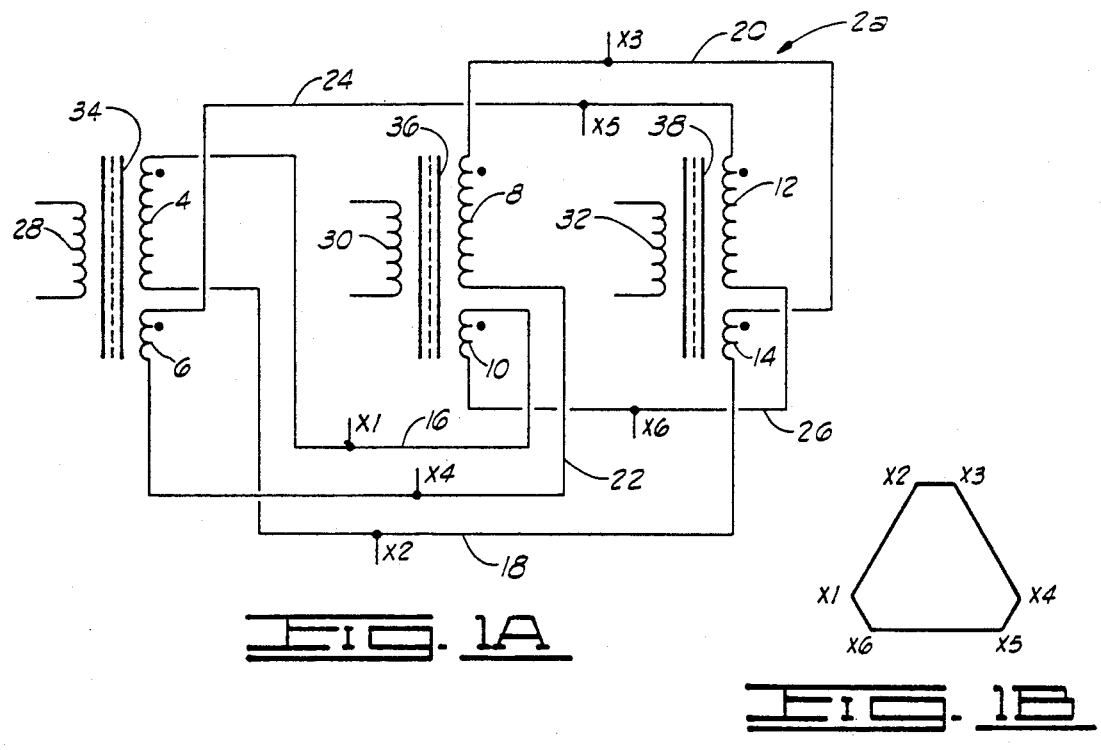
FIG. 1A
FIG. 1B
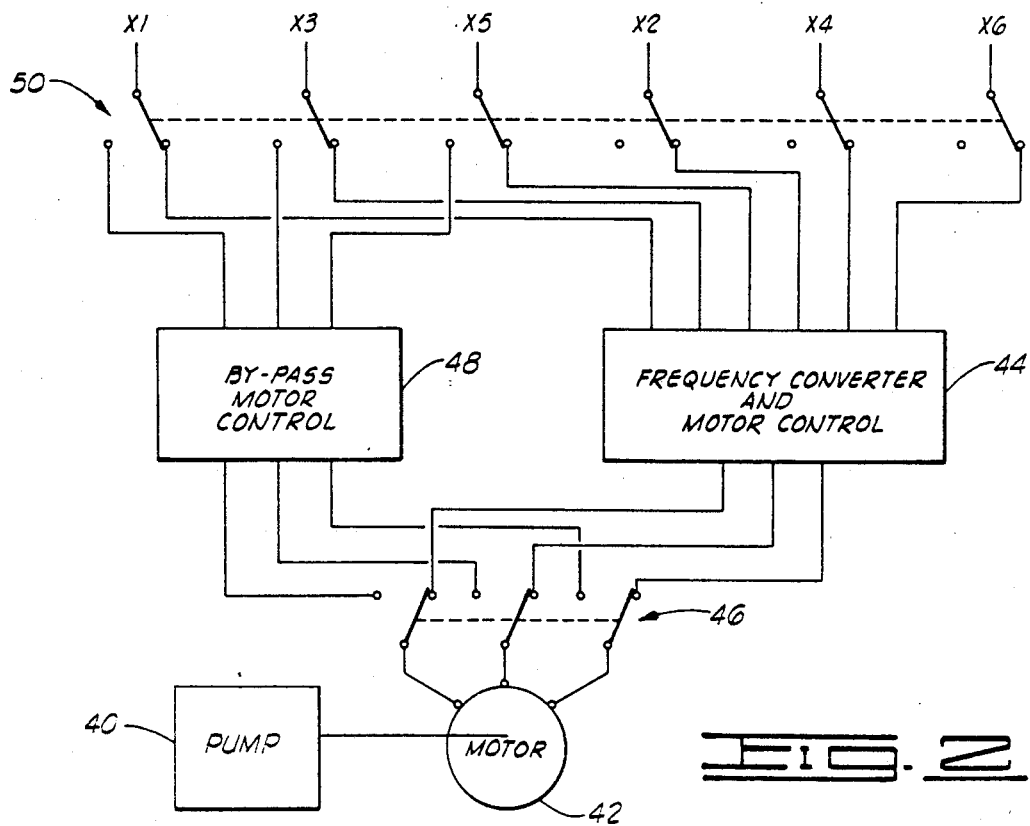
FIG. 2

TRANSFORMER PROVIDING TWO MULTIPLE PHASE OUTPUTS OUT OF PHASE WITH EACH OTHER, AND PUMPING SYSTEM USING THE SAME

BACKGROUND OF THE INVENTION

This invention relates generally to transformers and more particularly, but not by way of limitation, to a transformer which provides two three-phase outputs out of phase with each other. The present invention also relates to a pumping system using the transformer to energize a pump motor either through a twelve-pulse rectifier requiring the two out of phase three-phase outputs or through a by-pass motor controller actuating the motor directly with a single one of the three-phase outputs.

Multiple phase transformers, such as ones providing three-phase outputs as will be referred to herein for convenience, are typically used in systems having similar loads which can all be energized using a single three-phase output from the transformer. Some systems, however, require different types of outputs which heretofore might have required different transformers.

By way of an example, reference will be made to an oil pumping system having an electric submersible pump powered by a three-phase induction motor controlled through a speed control variable frequency drive (electronic frequency converter). This type of variable speed drive typically includes a twelve-pulse rectifier which requires two three-phase inputs which are 30° out of phase. This type of rectifier is maintenance intensive so that during maintenance of the rectifier, the electric motor driving the submersible pump must be powered by the same transformer but with the rectifier by-passed. This by-pass requires only a single three-phase output, but one capable of handling the entire load presented by the electric motor which drives the pump.

From the foregoing example, there is the need for a type of transformer which can supply power to a twelve-pulse rectifier such as those used in electronic frequency converters. Such transformer must alternately supply power directly to a three-phase load such as an induction motor. More specifically, there is the need for a single transformer having six outputs that can be switched to drive a three-phase load either through a device which needs two out of phase three-phase outputs or directly. It would be desirable if such a transformer could be implemented through one or more designs having a smaller equivalent transformer size relative to an isolation transformer. There is also the specific need for a pumping system utilizing such a transformer.

SUMMARY OF THE INVENTION

The present invention meets the foregoing needs by providing a novel and improved transformer and a pumping system using the transformer. The transformer of the present invention provides out of phase outputs which can be used in combination or singly to drive a multiple phase load. Particular embodiments of the transformer have smaller sizes relative to isolation transformers.

The present invention provides a transformer, comprising means for providing two three-phase outputs out of phase with each other so that together the outputs are adapted for activating a multiple-pulse rectifier connected to a three-phase load and so that one of the outputs is adapted for energizing the three-phase load without the other of the outputs in response to by-passing the rectifier, which means includes: six windings disposed in three pairs, the six windings interconnected in series so that first, second, third, fourth, fifth and sixth connection segments are defined in series among the windings; and first, second, third, fourth, fifth and sixth output terminals connected to the first, second, third, fourth, fifth and sixth connection segments, respectively, so that a first one of the two three-phase outputs is provided through the first, third and fifth output terminals and a second one of the three-phase outputs is provided through the second, fourth and sixth output terminals.

The present invention also provides a pumping system, comprising: a pump; a three-phase motor connected to the pump; a frequency converter including a twelve-pulse rectifier responsive to two three-phase voltages separated in time by a 30° phase angle; a by-pass motor controller; first switch means for selectably connecting the motor to either the frequency converter or the by-pass motor controller; transformer means for providing a first three-phase output and a second three-phase output 30° out of phase with the first three-phase output; and second switch means for connecting either the first and second three-phase outputs to the frequency converter or the first three-phase output to the by-pass motor controller so that the motor is driven either through the frequency converter or through the by-pass motor controller.

Therefore, from the foregoing, it is a general object of the present invention to provide a novel and improved transformer and a novel and improved pumping system. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1A is a schematic circuit diagram of a preferred embodiment of the transformer of the present invention.

FIG. 1B is a vector diagram of the two three-phase outputs provided by the transformer shown in FIG. 1A.

FIG. 2 is a schematic and block diagram of a pumping system using the transformer shown in FIG. 1A.

DETAILED DESCRIPTION OF THE PREFERRED EMBODIMENTS

Figures 3A, 3B:
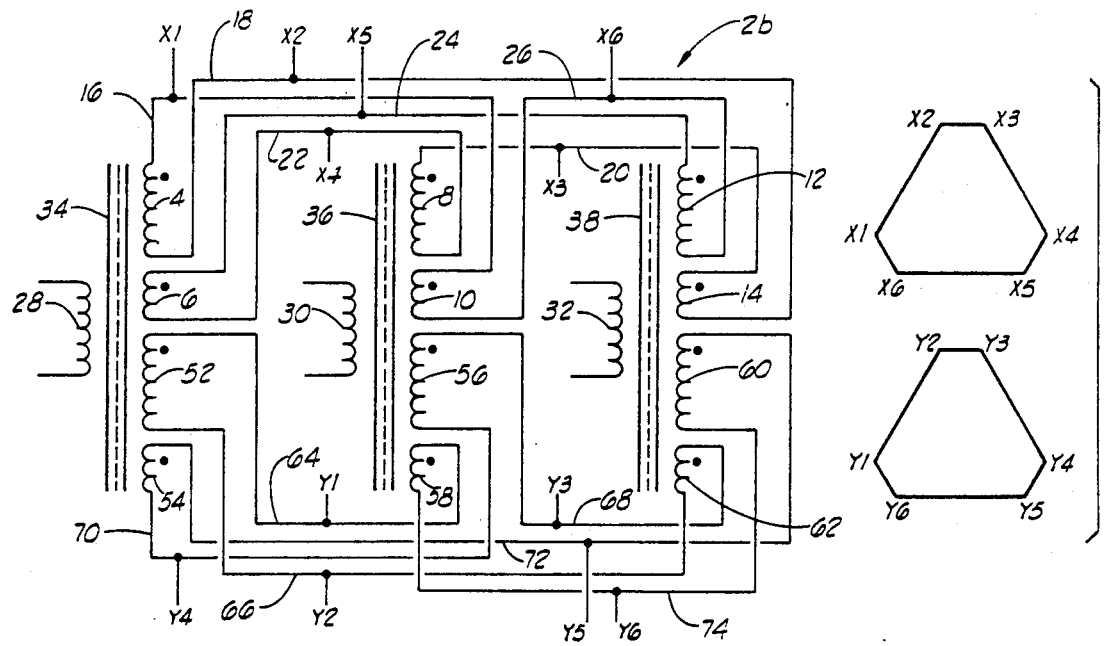
FIG. 3A is a schematic circuit diagram of another embodiment of the transformer of the present invention.
FIG. 3B shows vector diagrams of the four three-phase outputs provided by the transformer shown in FIG. 3A.

The present invention provides in its specific preferred embodiments transformer means for providing a first three-phase output and a second three-phase output 30° out of phase with the first three-phase output. Four embodiments of the transformer of the present invention are shown in the drawings. All four embodiments are adapted for three-phase systems and have at least six windings disposed in three pairs. The six windings are interconnected in the same serial configuration in each embodiment. Each of the four embodiments, along with embodiments of a pumping system exemplifying a particular usage of the transformer, will be described with reference to the drawings.

Referring to FIG. 1A, a transformer 2a includes six windings 4, 6, 8, 10, 12, 14 which are grouped in three pairs as illustrated. The windings 4, 6, 8, 10, 12, 14 are interconnected in electrical series. As drawn, these connections include connection segments 16, 18, 20, 22, 24, 26. Each of the windings 4, 6, 8, 10, 12, 14 is dot marked in FIG. 1A to indicate terminals of corresponding polarity. The common polarity ends of the windings 10, 4 are connected by the segment 16; the common polarity ends of the windings 4, 14 are connected by the segment 18; the common polarity ends of the windings 14, 8 are connected by the segment 20; the common polarity ends of the windings 8, 6 are connected by the segment 22; the common polarity ends of the windings 6, 12 are connected by the segment 24; and the common polarity ends of the windings 12, 10 are connected by the segment 26.

Connected to each of the segments 16, 18, 20, 22, 24, 26 is a respective output terminal labeled X1, X2, X3, X4, X5, X6, respectively. One three-phase output is provided through the terminals X1, X3, X5, and another three-phase output is provided through the terminals X2, X4, X6. These two outputs are out of phase with each other in accordance with the relationship between the windings of each of the three pairs in which the windings 4, 6, 8, 10, 12, 14 are configured.

With regard to the specific use in a pumping system described hereinbelow, the two three-phase outputs need to be separated in time by a 30° phase angle. To achieve this in the embodiments of the inventive transformer described herein, the turns ratio between the two associated windings within each pair (i.e., windings 4, 6, windings 8, 10 and windings 12, 14) theoretically needs to be $(1+\sqrt{3}):1$. In an actual transformer, however, windings are typically multiples of half turns; therefore, in practice the turns ratio needs to be "about" $(1+\sqrt{3}):1$. Examples of what constitutes "about" this ratio include 20.5 turns for windings 4, 8, 12 and 7.5 turns for windings 6, 10, 14 which gives a ratio of 2.73333:1 (within 5 parts in 10,000 of the desired theoretical ratio), and 19 turns for each of the windings 4, 8, 12 and 7 turns for each of the windings 6, 10, 14 providing a ratio of 2.714286:1 (within 7 parts in 1,000 of the desired theoretical ratio). A vector diagram showing the particular 30° phase relationship among the outputs through terminals X1, X2, X3, X4, X5, X6 is shown in FIG. 1B.

The embodiment shown in FIG. 1A also includes three primary windings 28, 30, 32. The winding 28 is inductively coupled by a suitable core medium 34 with the windings 4, 6. The winding 30 is similarly inductively coupled by a core 36 with the windings 8, 10, and the winding 32 is inductively coupled by a core 38 with the windings 12, 14. Each of the windings 28, 30, 32 is used to connect the transformer 2a to a suitable three-phase source in a manner known to the art. The primary windings 28, 30, 32 can be delta or wye connected.

The transformer 2a can have other applications, but a specific one of particular utility is illustrated in FIG. 2. A pumping system is shown in FIG. 2. This includes an electric submersible pump 40 of a known type such as can be used down hole in an oil well. The pump 40 is driven by a conventional three-phase induction motor 42 which is normally controlled by a conventional frequency converter and motor controller 44. The device 44 of the preferred embodiment includes a conventional twelve-pulse rectifier, which is responsive to two three-phase voltages separated in time by a 30° phase angle, and a conventional frequency inverter, which converts the rectifier output to a three-phase output provided to the motor 42. The three-phase output is connectable to the motor 42 through a three-pole, double-throw switch 46. Thus, for the FIG. 2 embodiment, the motor 42 is connected to the rectifier of the device 44 by the inverter thereof and the switch 46. The switch 46 is needed in the FIG. 2 embodiment because the presently known implementations of the device 44 are maintenance intensive so that when maintenance is required, the switch 46 can be moved to the other set of terminals shown in FIG. 2 connected to a by-pass motor controller 48. The controller 48 is of a known type for driving the motor 42 directly with a single three-phase input into the controller 48.

To selectably connect the appropriate outputs or output from the transformer 2a to the controller 44 or to the controller 48, the system shown in FIG. 2 further includes a six-pole, double-throw switch 50 having one set of 6 terminals connected in two groups of three each to the controller 44 and only three of the other set of six terminals connected to the controller 48. The six output terminals X1, X2, X3, X4, X5, X6 of the transformer 2a are connected to respective poles of the switch 50 as indicated by the X1 through X6 labeling in FIG. 2.

With the switch elements of the switch 50 in the position shown in FIG. 2, the two 30° out of phase three-phase outputs from the transformer 2a are connected to the controller 44. These two three-phase outputs as combined through the controller 44 handle the load presented by the motor 42. When the switch elements of the switch 50 are moved to the left as viewed in FIG. 2, only the three-phase output from terminals X1, X3, X5 is connected to the controller 48; the terminals X2, X4, X6 through which the other three-phase output is provided are open-circuited. Because of the serial connection of all six windings 4, 6, 8, 10, 12, 14, however, the full load presented by the motor 42 can still be met by the single three-phase output provided through the terminals X1, X3, X5. Thus, the motor 42, and its driven pump 40, can be fully energized by the appropriately selected fixed outputs of the terminals X1, X3, X5 and X2, X4, X6, either in combination or individually.

The windings 4, 6, 8, 10, 12, 14 of the embodiment shown in FIG. 1A are electrically connected so that the two three-phase outputs are not electrically isolated. There can be some applications where the two outputs need to be electrically isolated to avoid any induced voltage which might occur between the electrically connected outputs. A transformer 2b which provides electrically isolated outputs is shown in FIG. 3A. The transformer 2b includes a set of primary and secondary windings the same as in FIG. 1A as indicated by the use of the same reference numerals. Additionally, a second set of six secondary windings 52, 54, 56, 58, 60, 62 disposed in three pairs is included. These windings are connected in series. As drawn in FIG. 3A, these connections include connection segments 64, 66, 68, 70, 72, 74 for connecting the windings 52, 54, 56, 58, 60, 62 in the same manner as the windings 4, 6, 8, 10, 12, 14 are connected by the segments 16, 18, 20, 22, 24, 26. A second set of output terminals Y1, Y2, Y3, Y4, Y5, Y6 provides another two three-phase outputs out of phase with each other (by 30° in the preferred embodiment having the same turns ratio among the second set of windings as among the first set of six windings described above). The phase relationships are illustrated by the vector diagram shown in FIG. 3B. The outputs from the odd numbered terminals are out of phase with the outputs from the even numbered terminals, but the outputs from both sets of odd numbered terminals are in phase with each other as are the outputs from the two sets of even numbered terminals.

Figure 4:
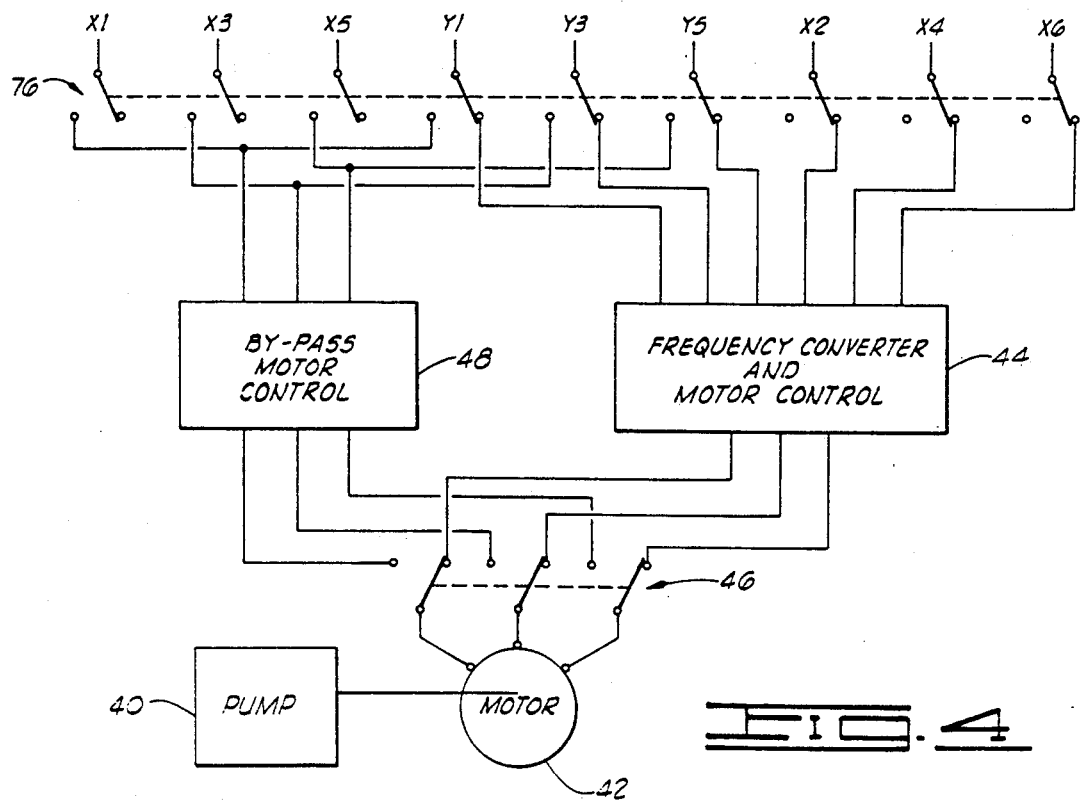
FIG. 4 is a schematic and functional block diagram of a pumping system using the transformer shown in FIG. 3A.

Referring to FIG. 4, a pumping system having the same components shown in FIG. 2, except for a nine-pole, double-throw switch 76, is shown. The pumping system of FIG. 4 utilizes the transformer 2b. As shown by the output connections to the poles of the switch 76, the electrically isolated, out of phase outputs through the terminals Y1, Y3, Y5 and X2, X4, X6 are used for energizing the frequency converter and motor controller 44, and the two in phase outputs provided through the terminals X1, X3, X5 and Y1, Y3, Y5 provide the one full three-phase source to the by-pass motor controller 48. The unused output from terminals Y2, Y4, Y6 is out of phase with the output from the terminals Y1, Y3, Y5 but in phase with the output from terminals X2, X4, X6.

Figure 5A:
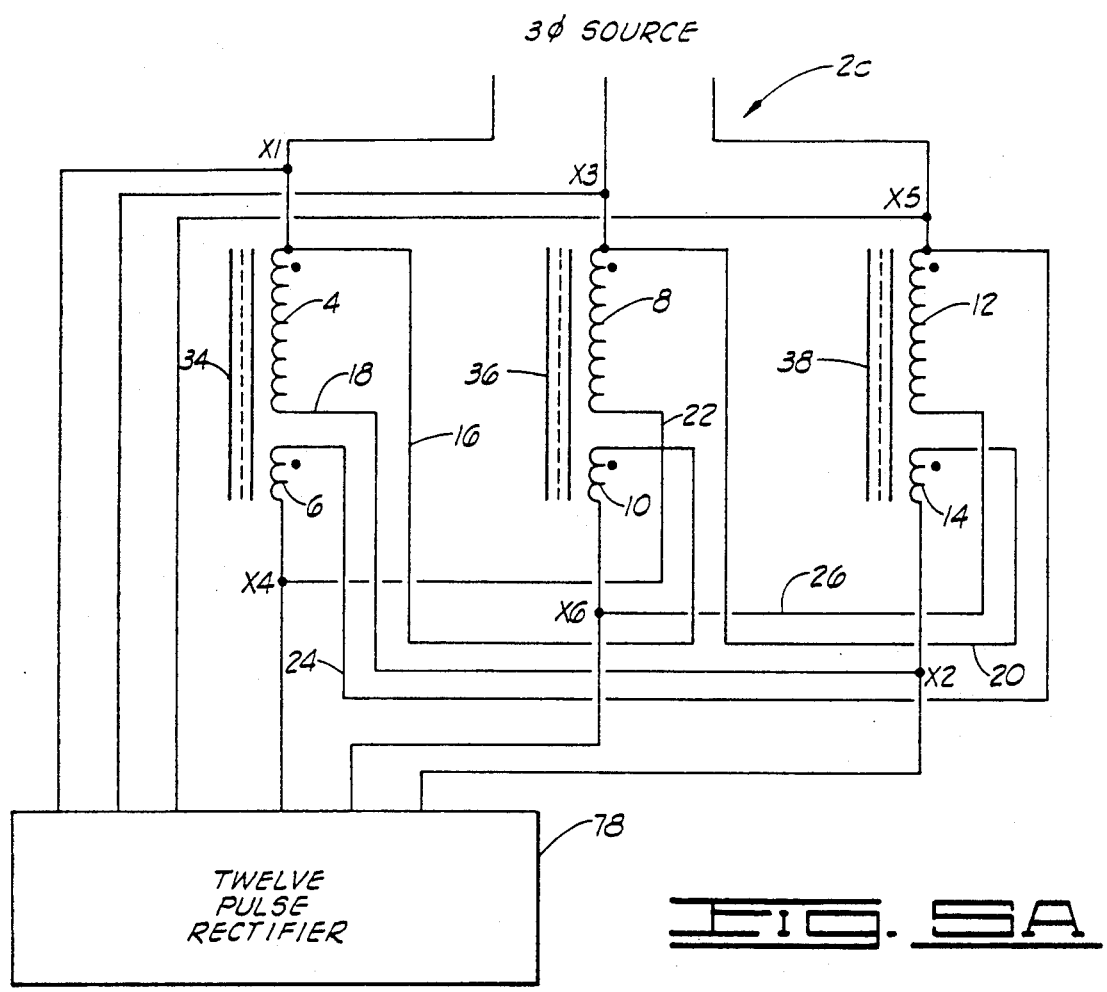
FIG. 5A is a schematic circuit diagram of another preferred embodiment of the transformer of the present invention suitable for use with a twelve-pulse rectifier and a pumping system of the type shown in FIG. 2.

Referring to FIG. 5A, a transformer 2c has the same windings 4, 6, 8, 10, 12, 14 and inductive relationships via cores 34, 36, 38 as shown in FIG. 1A, but without primary windings 28, 30, 32. The windings 4, 6, 8, 10, 12, 14 are interconnected by the connection segments 16, 18, 20, 22, 24, 26 the same as in FIG. 1A and the same three-phase output terminals X2, X4, X6 are provided. Outputs through terminals X1, X3, X5, however, are provided directly from the three-phase source as shown in FIG. 5A. Thus, the three-phase source must be the correct voltage for the rectifier 78 of the exemplary frequency converter and motor controller 44. Thus, the transformer 2c does not transform the voltage level from the source, but instead shifts the phase angle 30° in the particular embodiment. This transformer can be referred to as a phase shifting auto transformer.

As in other auto transformers, the equivalent transformer size relative to an isolation transformer such as shown in FIGS. 1A and 3A is smaller. In the transformer 2c having a turns ratio as previously described (theoretically $(1-\sqrt{3}):1$), the equivalent transformer size is the total kilovolt-amperes (kVA) drawn by the twelve pulse rectifier times $[(\sqrt{3}-1)/2\sqrt{3}]$ or 21.132 percent. Thus, for a 1000 kVA twelve-pulse rectifier, a 211.32 kVA transformer (physical size) is all that would be required.

Figure 5B:
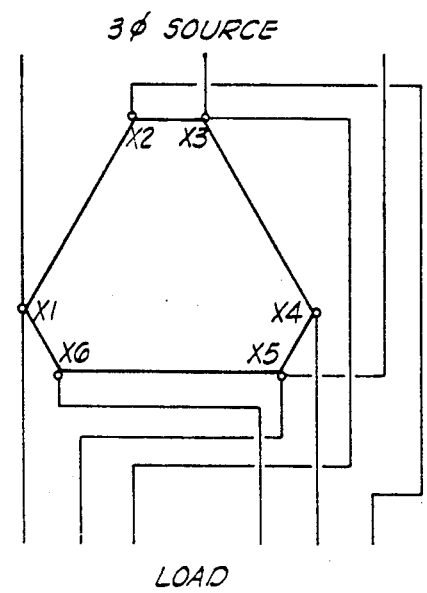
FIG. 5B is a combined schematic and vector diagram of the two three-phase outputs provided by the transformer shown in FIG. 5A.

A schematic circuit and vector diagram for the transformer 2c is shown in FIG. 5B. The transformer 2c can be used in the pump system shown in FIG. 2.

Figure 6A:
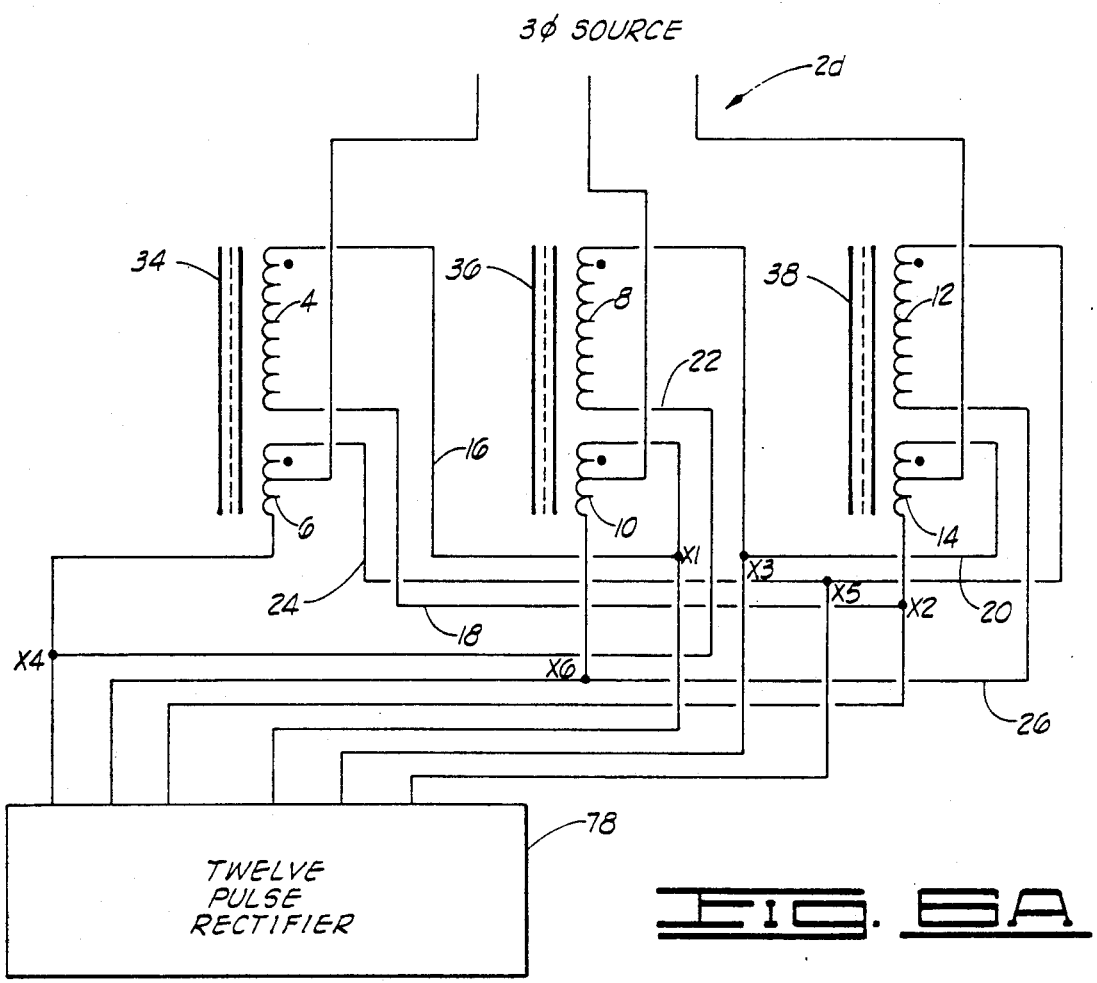
FIG. 6A is a schematic circuit diagram of another preferred embodiment of the transformer of the present invention suitable for use with a twelve-pulse rectifier and a pumping system of the type shown in FIG. 2.

A transformer 2d, which can also be used in the system shown in FIG. 2, is illustrated in FIG. 6A. This is another type of phase shifting auto transformer. The transformer 2d has the windings and connection segments the same as in FIG. 5A as indicated by the use of like reference numerals, but the three-phase source is connected to the centers of the windings 4, 8, 12. This still produces two out of phase three-phase outputs which can be used to operate the twelve-pulse rectifier 78 within the system shown in FIG. 2, for example.

Figure 6B:
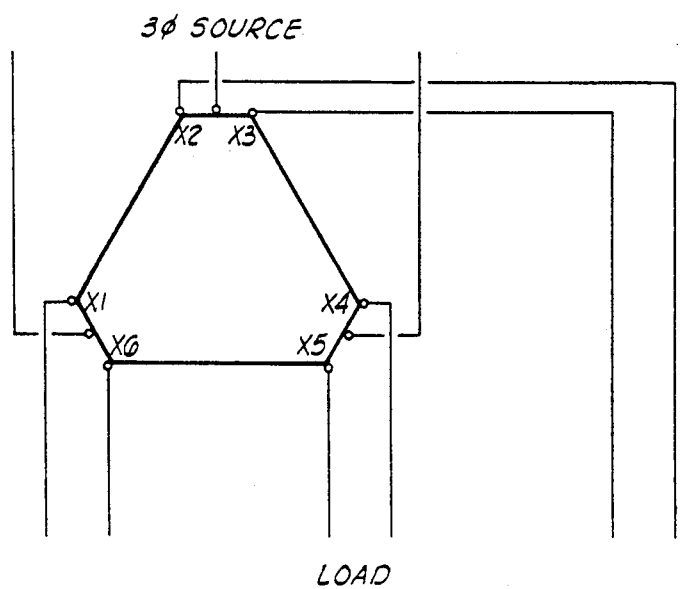
FIG. 6B is a combined schematic and vector diagram of the two three-phase outputs provided by the transformer shown in FIG. 6A.

For the transformer 2d, the three-phase source must be the correct (nominal) voltage for the rectifier, but the rectifier must be capable of operating at 3.5 percent above the source voltage. The rectifier must also be capable of operating from six lines (30° phase shift) which are electrically connected (not isolated). This is so because the configuration for the transformer 2d boosts the voltage 3.5 percent above the source voltage for the winding turns ratio of about $(1+\sqrt{3}):1$. The schematic circuit and vector diagram for the transformer 2d is shown in FIG. 6B.

The equivalent transformer size of the transformer 2d is also smaller relative to an isolation transformer such as transformers 2a and 2b. In the embodiment of FIG. 6A having the preferred turns ratio, the equivalent transformer size is the total kVA drawn by the twelve pulse rectifier 78 times 0.148 or 14.8 percent. Thus, for a 1000 kVA twelve-pulse rectifier, a 148 kVA transformer (physical size) of the FIG. 6A embodiment is all that is required. Thus, both the transformers 2c and 2d require less material and thus less cost than an isolation transformer of the types shown in FIGS. 1A and 3A.

The preferred embodiment three-phase transformers of the present invention can have either a construction of three single phases or one of one three-phase. Additionally, the transformers can be used in either direction so that what has been described as inputs and outputs could be outputs and inputs, respectively.

Thus, the present invention is well adapted to carry out the objects and attain the ends and advantages mentioned above as well as those inherent therein. While preferred embodiments of the invention have been described for the purpose of this disclosure, changes in the construction and arrangement of parts can be made by those skilled in the art, which changes are encompassed within the spirit of this invention as defined by the appended claims.

What is claimed is:

1. A transformer, comprising means for providing two three-phase outputs out of phase with each other so that together said outputs are adapted for activating a multiple-pulse rectifier of a controller connected to a three-phase load and so that one of said outputs is adapted for energizing the three-phase load without the other of said outputs in response to by-passing the controller, said means including:
   six windings disposed in three pairs, said six windings interconnected in series so that first, second, third, fourth, fifth and sixth connection segments are defined in series among said windings; and
   first, second, third, fourth, fifth and sixth output terminals connected to said first, second, third, fourth, fifth and sixth connection segments intermediate said six windings, respectively, so that a first of said two three-phase outputs is provided through said first, third and fifth output terminals and a second of said three-phase outputs is provided through said second, fourth and sixth output terminals.

2. A transformer as defined in claim 1 wherein said means further comprises:
 a first primary winding, inductively coupled with a first one of said three pairs of windings;
 a second primary winding, inductively coupled with a second one of said three pairs of windings; and
 a third primary winding, inductively coupled with a third one of three pairs of windings.

3. A transformer as defined in claim 1, wherein said means further comprises:
 a first input terminal, connected to said first connection segment;
 a second input terminal, connected to said third connection segment; and
 a third input terminal, connected to said fifth connection segment.

4. A transformer as defined in claim 1, wherein said means further comprises:
 a first input terminal, connected to the one of said six windings between said fourth and fifth connection segments;
 a second input terminal, connected to the one of said six windings between said first and sixth connection segments; and
 a third input terminal, connected to the one of said six windings between said second and third connection segments.

5. A transformer as defined in claim 1, wherein said means further includes:
 a second set of six windings disposed in a second set of three pairs electrically isolated from the first mentioned said three pairs, said second set of six windings interconnected in series so that a second set of first, second, third, fourth, fifth and sixth connection segments are defined in series among said second set of windings; and
 a second set of output terminals including first, second and third output terminals thereof connected to said first, third and fifth connection segments of said second set thereof, respectively, so that a third three-phase output is provided through said first, second and third output terminals of said second set thereof, said third three-phase output in phase with said first three-phase output, and said third three-phase output switchable between cooperative operation with said second three-phase output for actuating the multiple-pulse rectifier and cooperative operation with said first three-phase output for energizing the three-phase load in response to by-passing the controller.

6. A transformer, comprising:
 first and second windings, defining a first pair of transformer windings;
 third and fourth windings, defining a second pair of transformer windings;
 fifth and sixth windings, defining a third pair of transformer windings; and wherein:
 each of said first, second, third, fourth, fifth and sixth windings includes a respective first end and second end;
 said first end of said first winding is connected to said first end of said fourth winding;
 said second end of said first winding is connected to said second end of said sixth winding;
 said first end of said second winding is connected to said first end of said fifth winding;
 said second end of said second winding is connected to said second end of said third winding;
 said first end of said third winding is connected to said first end of said sixth winding;
 said second end of said fourth winding is connected to said second end of said fifth winding; and
 voltages output from or input to the connected first ends of said first and fourth windings, the connected first ends of said third and sixth windings and the connected first ends of said second and fifth windings are out of phase with voltages output from or input to the connected second ends of said first and sixth windings, the connected second ends of said second and third windings and the connected second ends of said fourth and fifth windings.

7. A transformer as defined in claim 6, further comprising:
 a seventh winding, inductively coupled with said first pair of transformer windings;
 an eighth winding, inductively coupled with said second pair of transformer windings; and
 a ninth winding, inductively coupled with said third pair of transformer windings.

8. A transformer as defined in claim 6, further comprising:
 means for connecting said first end of said first winding with a first phase conductor of a multiple phase conductor system;
 means for connecting said first end of said third winding with a second phase conductor of the multiple phase conductor system; and
 means for connecting said first end of said fifth winding with a third phase conductor of the multiple phase conductor system.

9. A transformer as defined in claim 6, further comprising:
 means for connecting the center of said second winding with a first phase conductor of a multiple phase conductor system;
 means for connecting the center of said fourth winding with a second phase conductor of the multiple phase conductor system; and
 means for connecting the center of said sixth winding with a third phase conductor of the multiple phase conductor system.

10. A transformer as defined in claim 6, wherein each of said first, second, third, fourth, fifth and sixth windings has a number of turns so that the ratio of turns between said first and second windings and between said third and fourth windings and between said fifth and sixth windings is about $(1+\sqrt{3}):1$.

11. A transformer as defined in claim 6, wherein said voltages are out of phase by a 30° phase angle.

12. A transformer as defined in claim 6, further comprising:
 seventh and eighth windings, defining a fourth pair of transformer windings;
 ninth and tenth windings, defining a fifth pair of transformer windings;
 eleventh and twelfth windings, defining a sixth pair of transformer windings; and wherein:
 each of said seventh, eighth, ninth, tenth, eleventh and twelfth windings includes a respective first end and second end;

said first end of said seventh winding is connected to said first end of said tenth winding;

said second end of said seventh winding is connected to said second end of said twelfth winding;

said first end of said eighth winding is connected to said first end of said eleventh winding;

said second end of said eighth winding is connected to said second end of said ninth winding;

said first end of said ninth winding is connected to said first end of said twelfth winding;

said second end of said tenth winding is connected to said second end of said eleventh winding;

voltages output from or input to the connected first ends of said seventh and tenth windings, the connected first ends of said ninth and twelfth windings and the connected first ends of said eighth and eleventh windings are out of phase with voltages output from or input to the connected second ends of said seventh and twelfth windings, the connected second ends of said eighth and ninth windings and the connected second ends of said tenth and eleventh windings; and said fourth, fifth and sixth pairs of transformer windings are electrically isolated from said first, second and third pairs of transformer windings.

13. A transformer as defined in claim 12, further comprising:

a thirteenth winding, inductively coupled with said first and fourth pairs of transformer windings;

a fourteenth winding, inductively coupled with said second and fifth pairs of transformer windings; and a fifteenth winding, inductively coupled with said third and sixth pairs of transformer windings.

14. A transformer as defined in claim 12, wherein:

said voltages output from or input to the connected ends of said first and fourth windings, the connected first ends of said third and sixth windings and the connected first ends of said second and fifth windings are in phase with said voltages output from or input to the connected first ends of said seventh and tenth windings, the connected first ends of said ninth and twelfth windings and the connected first ends of said eighth and eleventh windings; and said voltages output from or input to the connected second ends of said first and sixth windings, the connected second ends of said second and third windings and the connected second ends of said fourth and fifth windings are in phase with said voltages output from or input to the connected second ends of said seventh and twelfth windings, the connected second ends of said eighth and ninth windings and the connected second ends of said tenth and eleventh windings.

15. A transformer as defined in claim 12, wherein each of said first, second, third, fourth, fifth, sixth, seventh, eighth, ninth, tenth, eleventh and twelfth windings has a number of turns so that the ratio of turns between the respective windings of each of said pairs of transformer windings is about $(1+\sqrt{3}):1$.

16. A transformer as defined in claim 12, wherein said voltages which are out of phase are out of phase by a 30° phase angle.

* * * * *